(12) United States Patent
Parkman

(10) Patent No.: US 6,940,978 B2
(45) Date of Patent: Sep. 6, 2005

(54) TRANSMIT AUTHORIZATION

(75) Inventor: David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 09/847,679

(22) Filed: May 2, 2001

(65) Prior Publication Data

US 2002/0164028 A1 Nov. 7, 2002

(51) Int. Cl.[7] ................................................ H04K 1/00
(52) U.S. Cl. ...................... 380/270; 370/347; 455/403; 340/539.18
(58) Field of Search .......................... 380/270; 455/403, 455/427, 431, 428, 12.1; 370/347, 337, 442, 458, 312, 229, 238; 340/539.18

(56) References Cited

U.S. PATENT DOCUMENTS

| 3,777,062 | A |   | 12/1973 | Ogawa |   |
|---|---|---|---|---|---|
| 4,117,267 | A |   | 9/1978 | Haberle et al. |   |
| 4,926,478 | A |   | 5/1990 | Gruenberg |   |
| 5,625,640 | A |   | 4/1997 | Palmer et al. |   |
| 6,529,731 | B2 | * | 3/2003 | Modzelesky et al. | 455/427 |
| 6,539,007 | B1 | * | 3/2003 | Reeder et al. | 370/337 |
| 6,757,535 | B2 | * | 6/2004 | Parkman | 455/427 |
| 6,778,825 | B2 | * | 8/2004 | Parkman | 455/427 |

* cited by examiner

Primary Examiner—Gregory Morse
Assistant Examiner—Ellen C Tran
(74) Attorney, Agent, or Firm—Harness, Dickey & Pierce, P.L.C.

(57) ABSTRACT

A communications system and method for transmitting authorization messages to mobile platforms is provided. The communications system authorizes the mobile platform to continue transmitting data with a single signal rather than multiple signals. Specifically, the authorization signal comprises a unique address for a path of forward link equipment that transmits data to the mobile platform. The unique address informs the mobile platform which equipment is currently being used for data transmission, and the mobile platform then relays this information back to a ground station. The authorization signal further comprises a return link assignment that informs the mobile platform which transponder is to be used for data transmission back to the ground station. Accordingly, a single signal is used to transmit the required data to the mobile platforms.

9 Claims, 3 Drawing Sheets

TRANSMIT AUTHORIZATION

FIELD OF THE INVENTION

The present invention relates generally to bi-directional satellite communication systems and more particularly to a system and method for transmitting authorization messages from a ground station to a mobile platform.

BACKGROUND OF THE INVENTION

In bi-directional communications systems of the related art, a ground station transmits and receives signals to and from a satellite, and the satellite, in turn, transmits and receives signals to and from a mobile platform. Typically, a plurality of satellites are present that cover particular geographic regions, and each satellite further includes a plurality of transponders that receive data from the ground station and relay the data to the mobile platform. In addition, the mobile platform includes receive and transmit antennas, which are used to communicate with the satellite transponders and relay data to the ground station.

For mobile platforms that transmit data, UTC (Universal Time Code) regulations require that the mobile platform receive authorization to continue transmitting within a thirty (30) second interval. If the mobile platform does not receive authorization to continue transmitting from the ground station within the thirty (30) second interval, the mobile platform must terminate transmission of data. The authorization is generally transmitted from the ground station to the mobile platform, via the transponder, in a separate signal that contains only an authorization message. Since there exist several other data transmissions between the ground station and the mobile platform, the authorization message signal increases the number of transmissions and the associated time and cost in managing the transmissions from the ground station. The more data signals that are transmitted to the mobile platform, the greater the complexity and cost of the overall communications system.

Accordingly, there remains a need in the art for a communications system that can use other data signals of a communications system to authorize transmission in order to increase operational efficiency and reduce overall costs.

SUMMARY OF THE INVENTION

In one preferred form, the present invention provides a communications system and method that uses a signal comprising a unique address for a path of forward link equipment within a ground station. The forward link equipment is used to transmit data signals from a ground station to a mobile platform, via a transponder, and the forward link equipment further comprises a unique address for its path. Generally, the unique address is transmitted to the mobile platform so that the mobile platform can inform the ground station which path of forward link equipment is transmitting data in the event of an equipment failure. The communications system of the present invention uses the unique address message signal as the authorization message rather than having two separate signals.

Additionally, the unique address signal must be transmitted to the mobile platform at least every (30) seconds in order to meet UTC regulations. UTC regulations require that the mobile platform receive authorization to continue transmitting within a thirty (30) second interval. If the mobile platform does not receive authorization from the ground station within the thirty (30) second interval, the mobile platform must terminate transmission of data. Therefore, the signal comprising the unique address and the authorization message must be transmitted to the mobile platform at least every thirty (30) seconds.

In another preferred form, the present invention provides a communications system and method that uses a signal comprising a return link assignment. Generally, the return link assignment is a signal that informs the mobile platform which transponder is to be used to transmit information back to the ground station. The communications system of the present invention uses the return link assignment message signal as the authorization message rather than having two separate signals. Similarly, the signal must be transmitted at least every thirty (30) seconds so that the mobile platform can continue transmitting data.

In yet another preferred form, the present invention provides a communications system and method that combines the unique address and the return link assignment in one signal. As a result, one signal is transmitted to the mobile platform rather than two separate signals. Similarly, the signal must be transmitted at least every thirty (30) seconds so that the mobile platform can continue transmitting data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
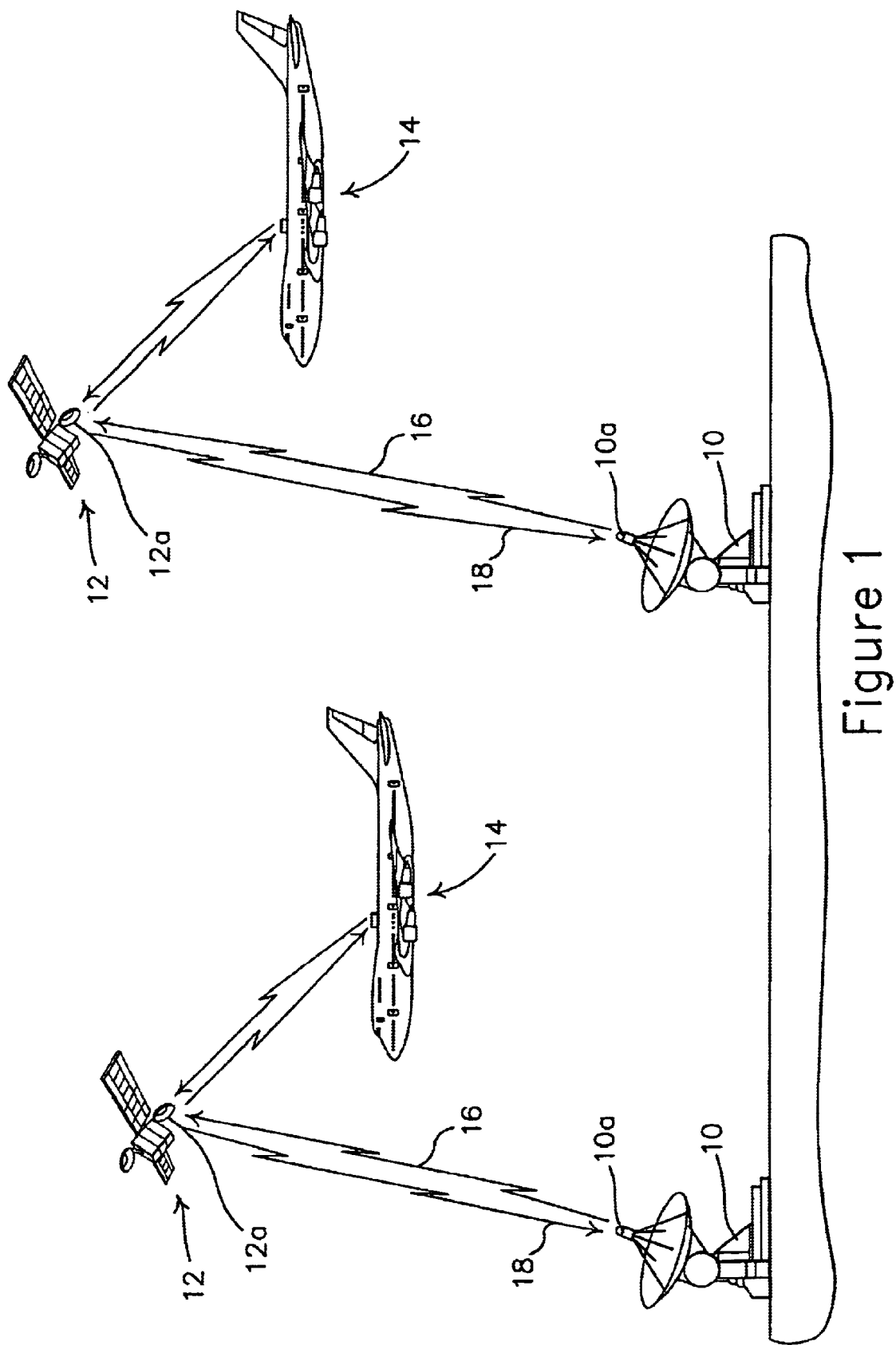
FIG. 1 is a simplified diagram illustrating bi-directional communication environment of the present invention.

The preferred embodiment of the communications system of the present invention operates in an environment as illustrated in FIG. 1. The environment generally comprises a ground station 10 in communication with a satellite 12, which in turn is in communication with a mobile platform 14. As shown, there may exist a plurality of ground stations 10, satellites 12, and mobile platforms 14 around the world for continuous data communications regardless of geographic location. In operation, data is transmitted from the ground station 10 to the mobile platform 14 through a forward link 16, and data, in turn, is transmitted from the mobile platform 14 to the ground station 10 through a return link 18. Additionally, the ground station 10 generally manages and controls all data, which is transmitted to mobile platforms 14 via transponders 12a located on satellites 12.

Although the present invention is directed to a communications system wherein the mobile platform is an aircraft, the invention is also applicable to other mobile platforms such as ships, trains, buses, and others. Accordingly, the reference to aircraft throughout the description of the invention herein should not be construed as limiting the applicability of the invention to only aircraft.

Figure 2:
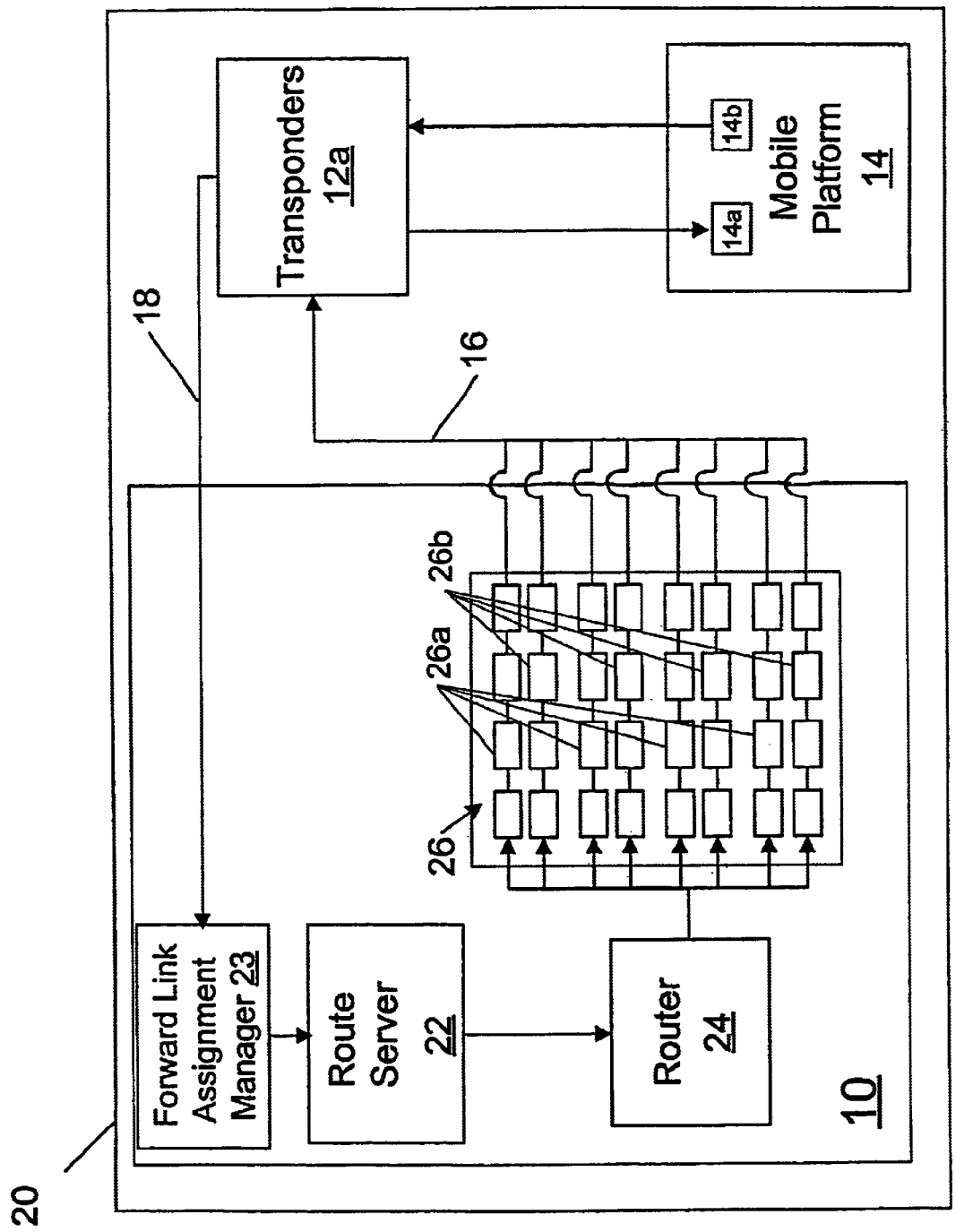
FIG. 2 is a block diagram illustrating the transmission of signals to the mobile platform of the present invention.

Referring to FIG. 2, the preferred embodiment of the communications system of the present invention is illustrated and generally indicated by reference numeral 20. As shown, communications system 20 comprises a forward link assignment manager 23 in communication with a route server 22 and a router 24, wherein the router 24 communicates with chains of forward link equipment 26. The chains of forward link equipment 26 then transmit signals 16 to the mobile platform 14 via transponders 12a.

Each chain of forward link equipment has a unique path, e.g. 26a, 26b, and so on, and each path further has a unique address. Further, the unique address of the chain of forward link equipment 26 is transmitted to the receivers 14a of mobile platform 14 along with the data being transmitted via transponders 12a. Accordingly, the mobile platform 14 is constantly aware of which chain of forward link equipment 26 is providing its data.

In addition, the mobile platform 14 must receive a transponder assignment from the ground station 10 that informs mobile platform 14 which transponder is to be used for data transmission back to the ground station 10 through return link 18. Accordingly, the ground station transmits a return link assignment to the mobile platform 14 through forward link 16 via transponder 12a.

In one preferred form, the communications system 20 uses the unique address of the forward link equipment contained within transmit signals 16 as the authorization message. The authorization message is required under UTC regulations so that mobile platform 14 can continue transmitting signals. If the mobile platform 14 does not receive authorization to continue transmitting within a thirty (30) second interval, the mobile platform 14 must terminate transmissions. Rather than transmit a separate signal comprising only the authorization message, the communications system 20 of the present invention uses the unique address as the authorization message. The signal containing the unique address is then transmitted at least every thirty (30) seconds in order to meet UTC regulations.

In another preferred form, the communications system 20 uses the return link assignment message contained within transmit signal 16 as the authorization message. Similarly, a single signal comprising the return link assignment is transmitted to the mobile platform 14 rather than two separate signals. The signal containing the return link assignment is then transmitted at least every thirty (30) seconds in order to meet UTC regulations.

In yet another preferred form, the communications system 20 combines the unique address and the return link assignment into a single signal rather than transmitting two separate signals. Similarly, the combined signal is then transmitted at least every thirty (30) seconds in order to meet UTC regulations. As a result, the communications system 10 is more efficient and cost effective through combining various data types into a single signal that is transmitted to the mobile platform.

Figure 3:
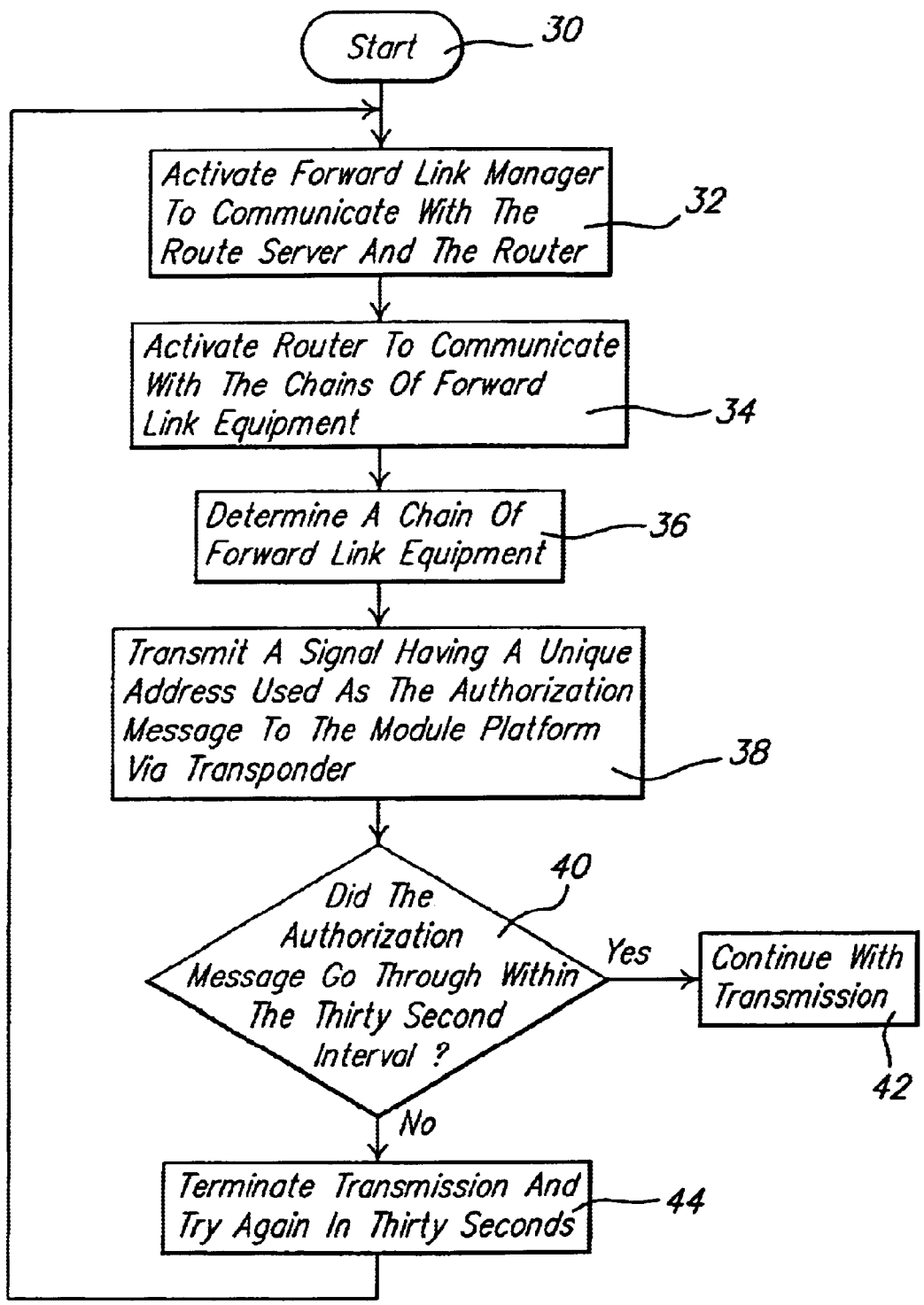
FIG. 3 is a flowchart illustrating the operational steps of the present invention.

FIG. 3 is a flowchart showing the operational steps of the communication system 20. The communications system 20 starts in step 30. In step 32, the forward link assignment manager 23 is activated to communicate with the router server 22 and the router 24. In doing so, the ground station 10 is able to communicate with the mobile platform 14. In step 34, the router is activated to communicate with at least one chain of the chains of forward link equipment 26. The chain used in the chains of forward link equipment 26 is determined in step 36. In step 38, the signal 16 is transmitted having the unique address used as the authorization message to the mobile platform 14 via transponders 12a. In decision step 40, the mobile platform 14 determines if the authorization message was received within the thirty second interval. If true, then transmission continues in step 42. If false, then the mobile platform 14 terminates transmission and the unique address is then transmitted at least every thirty seconds as indicated in step 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for transmitting an authorization message to a mobile platform comprising:
   at least one base station having transmit equipment, the transmit equipment further comprising a path having a unique address; and
   at least one space-based transponder that transmits data to the mobile platform;
   wherein when the transmit equipment transmits the unique address in a signal to the mobile platform via the space-based transponder, the unique address serves as the authorization message, and wherein the signal is transmitted to the mobile platform repeatedly at a predetermined interval.

2. A system for transmitting an authorization message to a mobile platform comprising:
   at least one base station having transmit equipment, the transmit equipment comprising return link assignments; and
   at least one space-based transponder that transmits data to the mobile platform;
   wherein when the transmit equipment transmits the return link assignment in a signal to the mobile platform via the space-based transponder, the return link assignment serves as the authorization message, and wherein the signal is transmitted to the mobile platform repeatedly at a predetermined interval.

3. A system for transmitting an authorization message to a mobile platform comprising:
   at least one base station having transmit equipment, the transmit equipment further comprising a path having a unique address and return link assignments; and
   at least one space-based transponder that transmits data to the mobile platform;
   wherein the transmit equipment combines the unique address and the return link assignment into a single signal that serves as the authorization message, and wherein the single signal is transmitted to the mobile platform repeatedly at a predetermined interval.

4. A method for transmitting an authorization message from a base station to a mobile platform, the method comprising the steps of:
   (a) transmitting a signal comprising a unique address from a base station to a mobile platform via a space-based transponder;
   (b) using the unique address as the authorization message;
   (c) transmitting the signal to the mobile platform repeatedly at a predetermined interval; and
   (d) using the authorization message to authorize the mobile system to continue transmitting for a predefined time period after receiving the authorization message.

5. A method for transmitting an authorization message from a base station to a mobile platform, the method comprising the steps of:
   (a) transmitting a signal comprising a return link assignment from a base station to a mobile platform via a space-based transponder;
   (b) using the return link assignment as the authorization message;
   (c) transmitting the signal to the mobile platform repeatedly at a predetermined interval; and
   (d) using the authorization message to authorize the mobile system to continue transmitting for a predefined time period after receiving the authorization message.

6. A method for transmitting an authorization message from a base station to a mobile platform, the method comprising the steps of:
   (a) embedding a return link assignment within a signal comprising a unique address;
   (b) transmitting the signal comprising the unique address and the return link assignment from a base station to a mobile platform via a space-based transponder;
   (c) transmitting the combination return link assignment and unique address signal to the mobile platform repeatedly at a predetermined interval; and
   (d) using the authorization message to authorize the mobile system to continue transmitting for a predefined time period after receiving the authorization message.

7. A method for transmitting an authorization message from a base station to a mobile platform, the method comprising the steps of:
   (a) activating a link manager to communicate with a routing unit that provides communication between the base station and the mobile platform via transmitting equipment;
   (b) determining a path having a unique address used as the authorization message;
   (c) transmitting a signal comprising the unique address from the transmitting equipment to the mobile platform repeatedly at a predetermined interval via a space-based transponder; and
   (d) using the authorization message to authorize the mobile system to continue transmitting for a predefined time period after receiving the authorization message.

8. A method for transmitting an authorization message from a base station to a mobile platform, the method comprising the steps of:
   (a) activating a link manager to communicate with a routing unit that provides communication between the base station and the mobile platform via transmitting equipment;
   (b) determining a path having a return link assignment used as the authorization message;
   (c) transmitting a signal comprising the return link assignment from the transmitting equipment to the mobile platform repeatedly at a predetermined interval via a space-based transponder; and
   (d) using the authorization message to authorize the mobile system to continue transmitting for a predefined time period after receiving the authorization message.

9. A method for transmitting an authorization message from a base station to a mobile platform, the method comprising the steps of:
   (a) activating a link manager to communicate with a routing unit that provides communication between the base station and the mobile platform via transmitting equipment;
   (b) determining a single path having both a unique address and a return link assignment used as the authorization message;
   (c) transmitting a signal comprising the unique address and the return link assignment from the transmitting equipment to the mobile platform repeatedly at a predetermined interval via a space-based transponder; and
   (d) using the authorization message to authorize the mobile system to continue transmitting for a predefined time period after receiving the authorization message.

* * * * *